(12) United States Patent  (10) Patent No.: US 8,589,231 B2
Yankov et al.  (45) Date of Patent: Nov. 19, 2013

(54) SENSITIVITY CATEGORIZATION OF WEB PAGES

(75) Inventors: Dragomir Yankov, Sunnyvale, CA (US); Suju Rajan, Sunnyvale, CA (US); Scott J. Gaffney, Sunnyvale, CA (US); Dun Liu, Sunnyvale, CA (US); Wanlin Pang, Sunnyvale, CA (US); Adwait Ratnaparkhi, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 642 days.

(21) Appl. No.: 12/696,006

(22) Filed: Jan. 28, 2010

(65) Prior Publication Data

US 2011/0184817 A1  Jul. 28, 2011

(51) Int. Cl.
G06Q 30/00 (2012.01)
(52) U.S. Cl.
USPC ........................................................ 705/14.6
(58) Field of Classification Search
USPC ........................................................ 705/14.6
See application file for complete search history.

(56) References Cited

U.S. PATENT DOCUMENTS

2008/0320010 A1* 12/2008 Li et al. .......................... 707/100

OTHER PUBLICATIONS

"Page ranking and topic-sensitive page ranking: micro-changes and macro-impact"; Rimbach, F; Dannenberg, M; Bleimann, U; Internet Research; v17n1; pp. 38; 2007.*
Bruce, I.S. (Jun. 18, 2006). The battle for advertising: Internet giants get ready for full combat World Wide Web: Revenue Search with eBay launching context-sensitive advertising, the contest for customers is set to reach new heights. Sunday Herald. Retrieved from http://search.proquest.com/docview/331192186?accountid=14753.*

* cited by examiner

*Primary Examiner* — John G Weiss
*Assistant Examiner* — Michael Stibley
(74) *Attorney, Agent, or Firm* — Martine Penilla Group, LLP

(57) ABSTRACT

Methods, systems, and computer programs for categorizing the sensitivity of web pages are presented. In one method, a space of sensitive pages is identified based on the sensitivity categorization of a first plurality of web pages and a second plurality of web pages. The first plurality of web pages is obtained by performing search queries using known sensitive words, and the second plurality of web pages includes randomly selected web pages. Additionally, the method identifies a third plurality of web pages that includes web pages on or near the boundary between the space of sensitive pages and the space of non-sensitive pages. The space of sensitive pages is then redefined based on the sensitivity categorization of the first, second, and third pluralities of web pages. Once the space of sensitive pages is defined, the method is used to determine that a given web page is sensitive when the given web page is in the space of sensitive pages. Web pages are included in a marketing operation when the web pages are not sensitive.

20 Claims, 11 Drawing Sheets

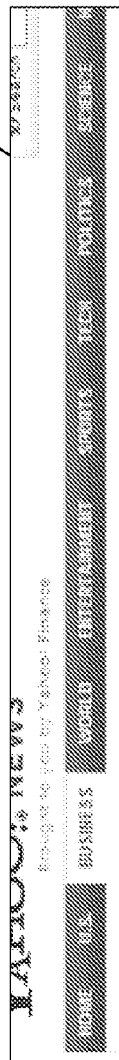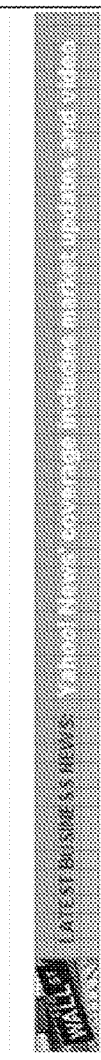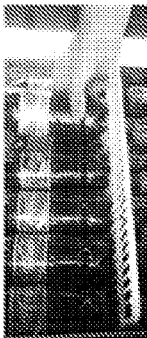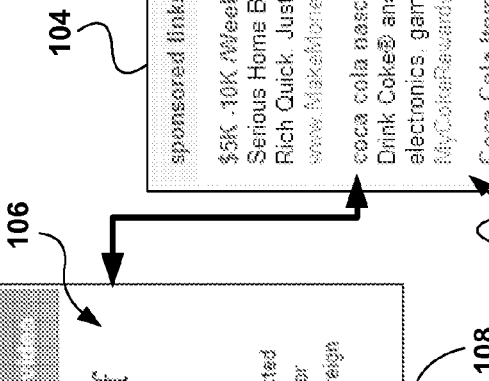
Fig. 1

Performance of the classifiers before and after Active Learning (AL)

SENSITIVITY CATEGORIZATION OF WEB PAGES

BACKGROUND

1. Field of the Invention

The present invention relates to methods and computer programs for selecting media candidates for advertising, and more particularly, methods, systems, and computer programs for sensitivity categorization of web pages.

2. Description of the Related Art

The computing industry has seen many advances in recent years, and such advances have produced a multitude of products and services. Internet websites are examples of products and services, which are created to give users access to particular types of services, data, or searching capabilities. Online content providers are increasingly moving towards building World Wide Web sites which are more reliant on dynamic, frequently-updated content. Content continues to be made available more and more via online auction sites, stock market information sites, news and weather sites, or any other such site whose information changes on a frequent basis, oftentimes daily.

Reputable advertisers do not want their ads associated with pages of sensitive nature. Many advertisers require that their ads be shown only on pages that do not have sensitive content, such as content related to adult themes, alcohol, illegal drugs, death and suffering news, etc. Advertising in such sensitive pages would have a negative impact on the image of advertisers and their products or services.

A system is required to identify when web pages contain sensitive material in order to allow advertisers to stop from advertising in these pages. However, given the enormous varieties of pages available on the web, it is practically impossible to categorize all pages in a precise manner, and some sensitive pages will be wrongly categorized as being non-sensitive. This can cause problems for the ad-placement companies because advertisers will be unhappy if their products are shown in these pages.

On the other hand, a categorization system can define very stringent criteria to avoid this problem. As a result, many pages that are not sensitive will be categorized as sensitive to improve the margin of error. This creates a problem for the ad-placement companies as their inventory of web pages is diminished.

The primary requirement for sensitivity categorization is to have models that achieve very high recall, i.e., retrieve as many of the sensitive pages as possible, with a reasonable precision. Two specific aspects of sensitivity categorization make it a hard problem. First, categorizing web pages is an inherently difficult task even for humans. Web pages typically have several facets and identifying a page as 'sensitive' is often subjective. Second, sensitive pages are rare. This implies a biased sampling and training process which might generalize poorly on real traffic.

It is in this context that embodiments of the invention arise.

SUMMARY

Embodiments of the present invention provide methods, systems, and computer programs for categorizing the sensitivity of web pages. It should be appreciated that the present invention can be implemented in numerous ways, such as a process, an apparatus, a system, a device or a method on a computer readable medium. Several inventive embodiments of the present invention are described below.

In one embodiment of a method, a space of sensitive pages is identified based on the sensitivity categorization of a first plurality of web pages and a second plurality of web pages. The first plurality of web pages is obtained by performing search queries using known sensitive words and the second plurality of web pages includes randomly selected web pages. Additionally, the method identifies a third plurality of web pages that includes web pages on or near the boundary between the space of sensitive pages and the space without sensitive pages. The space of sensitive pages is then defined using the first, second, and third pluralities of web pages. Once the space of sensitive pages is defined, the method is used to determine that a given web page is sensitive when the given web page is in the space of sensitive pages. Web pages are included in a marketing operation when the web pages are not sensitive.

In another embodiment, a computer program includes program instructions for identifying a space of sensitive pages based on a sensitivity categorization of a first plurality of web pages and a second plurality of web pages. The first plurality of web pages is obtained from search queries that use known sensitive words, and the second plurality of web pages are randomly selected web pages. Further, the computer program includes instructions for identifying a third plurality of web pages. The third plurality of web pages includes pages on or near a boundary between the space of sensitive pages and the space without sensitive pages. Additionally, program instructions redefine the space of sensitive pages based on a sensitivity categorization model trained on the first, second, and third pluralities of web pages. The computer program also includes instructions for determining that a given web page is sensitive when the given web page is in the space of sensitive pages, and instructions for including the given web page in a marketing operation when the given web page is determined to be not sensitive. The given web page is discarded for the marketing operation if the web page is sensitive.

In yet another embodiment, a method for sensitivity categorization of web pages is presented. The method includes selecting a first plurality of web pages by performing an internet search query for each known sensitive word. The result is a set of web pages for each known sensitive word. Further, the method includes selecting a predetermined number of top results within each result set, and combining together the selected top results with a randomly selected set of web pages to obtain the second plurality of web pages. A space of sensitive pages is identified based on the sensitivity categorization of the first plurality and the second plurality of web pages. Additionally, a third plurality of web pages is identified. This third plurality includes web pages on or near the boundary between the space of sensitive pages and the space without sensitive pages. The method also includes an operation to redefine the space of sensitive pages based on a sensitivity categorizer trained on the first, second, and third pluralities of web pages, and an operation to determine that a given web page is sensitive when the given web page is in the space of sensitive pages. The given web page is included in a marketing operation when the given web page is determined to be not sensitive and discarded for the marketing operation otherwise.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 1 illustrates a proper webpage-content match for placing advertisements on a non-sensitive webpage.

DETAILED DESCRIPTION

Figure 2:
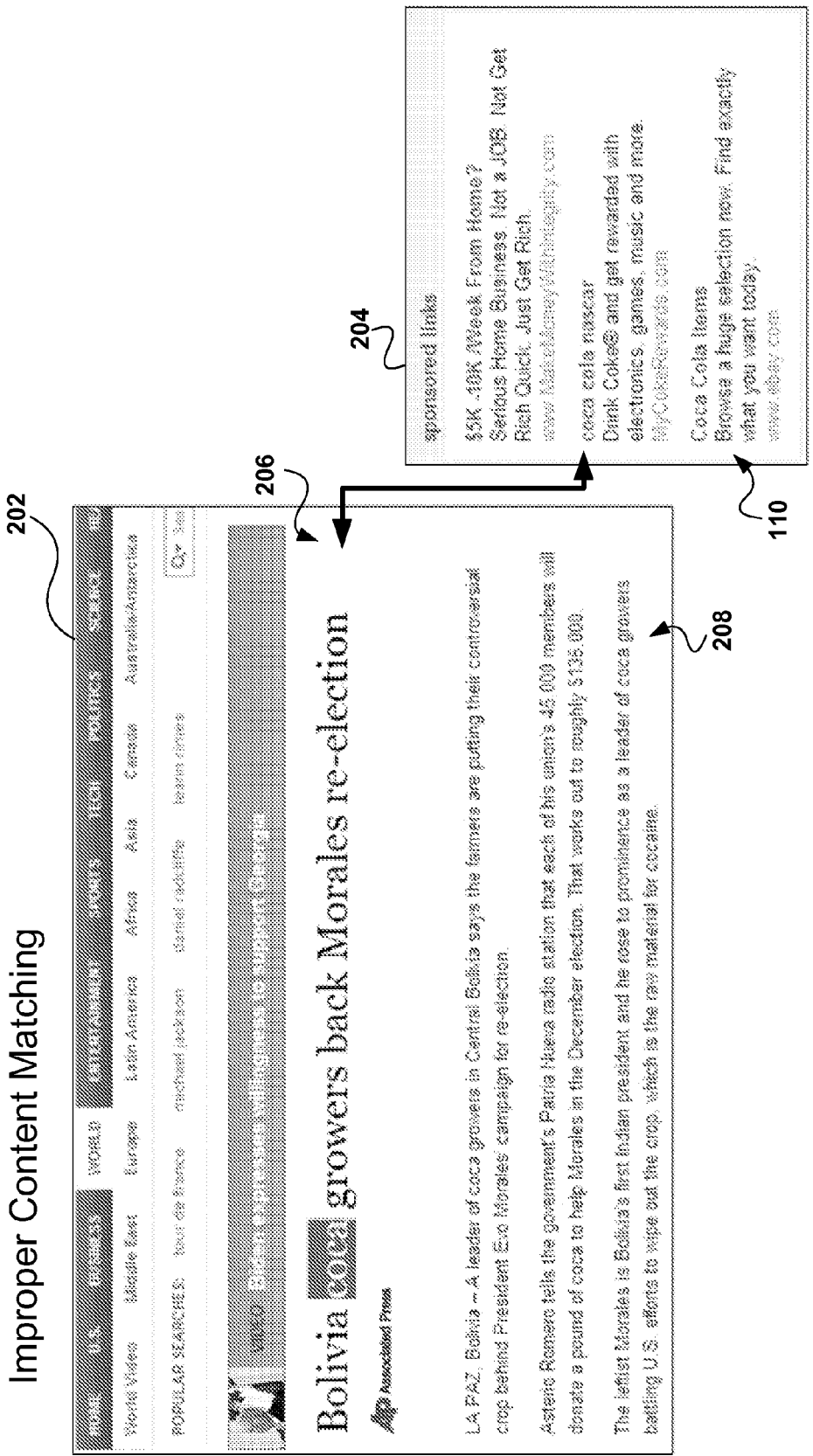
FIG. 2 illustrates an improper webpage-content match for placing ads on a sensitive webpage.

The following embodiments describe methods, systems, and computer programs for categorizing the sensitivity of content in web pages. It will be obvious, however, to one skilled in the art, that the present invention may be practiced without some or all of these specific details. In other instances, well known process operations have not been described in detail in order not to unnecessarily obscure the present invention.

In one embodiment, a categorization system uses eleven different sensitive categories: adult, alcohol, firearms, weapons, gambling, illegal drugs, online pharmacies, tobacco, hard news—controversial, hard news—death and suffering, and hard news—scandal. Automated document categorization methods require training data that has a concept-rich set of representative documents from the category to be detected (e.g., adult category). Categorization methods also require a comprehensive set of documents from the remaining categories in the data (e.g., everything non-adult).

There are two challenges in collecting such a training set. First, the training documents should be representative for the population of documents associated with the task at hand, i.e., they should be representative for the population of pages on which companies such as Yahoo!, Google, and Microsoft place contextual or display ads. Second, the collected set of documents to be used for training the automated system should be limited, otherwise large number of editors will be required to label the pages and making the process prohibitively costly.

Obtaining a representative training set from the advertising traffic is hard as the traffic involves hundreds of millions of pages and some of the desired categories to be detected are very sparse. Sparsity is a characteristic for all sensitivity categories. The categories are sparse because the sensitive pages represent a small percentage of the overall traffic, such as 0.5% although other values are also possible.

To guarantee a concept rich set of pages from these categories using standard statistical techniques, it may be needed to sample hundreds of thousands of pages, which need to be examined manually and labeled by human editors. As this is very costly, embodiments of the invention present a cheaper and effective alternative using a small number of pages (a few thousand web pages or less) and resulting in a concept rich training set. Such a training set can be labeled by a few editors within a couple of days. This is achieved through Active Learning (AL), where up to 1,000 to 2,000 new web pages are automatically selected and then labeled by editors.

The automated system trained on this set needs to be calibrated to obtain thresholds that can be operated upon. The result is a web page categorization which is unbiased and can detect accurately sensitive pages in the advertising traffic at a very low cost.

FIG. 1 illustrates a proper webpage-content match for placing advertisements on a non-sensitive webpage. When a user requests page 102 from a website, the page is downloaded to the user's browser and advertisement 104 is added to the page. More details about the process to place ads in web pages are given below in reference to FIG. 3. One ad delivery method uses contextual advertising to select the ads. With contextual advertising, the ad delivered to the requested page is based on the content or "context" of the requested page. For example, page 102 has the title 106 "Coke tops view despite currency hit, shares off." By analyzing title 106 and content 108, it can be seen that the subject of page 102 is related to the drink Coca-Cola®.

A contextual advertiser has configured the system to deliver ads to Coca-Cola related pages, therefore advertisement 110 is included in the commercial advertisement content 104 added to web page 102. Advertisement 110 refers to a promotion by Coca-Cola and NASCAR®. Since content of the page (Coca-Cola news) is related to the desire of the advertiser (Coca-Cola related information), the matching of the content with the ad is proper. It should also be noted, that the content of page 102 refers to financial news and is not considered sensitive content in this case.

FIG. 2 illustrates an improper webpage-content match for placing ads on a sensitive webpage. Web page 202 holds content 208 related to the drug cocaine. Title 206 reads "Bolivia coca growers back Morales re-election." The word coca here refers to the plant from which the drug cocaine is extracted, and not a short term for the drink Coca-Cola. Because the content is related to drugs, page 202 is considered sensitive. The same advertiser as in FIG. 1 sees ad 110 placed within advertisement content 204 added to page 202. This placement is improper for two reasons: page 202 is sensitive, and content 208 relates to the coca plant and not to Coca-Cola. Embodiments of the invention are used to solve the first problem described, i.e., how to avoid placing ads in content sensitive pages. Known methods in the art can be used to solve the improper matching of web pages with advertisement using keywords.

Figure 3:
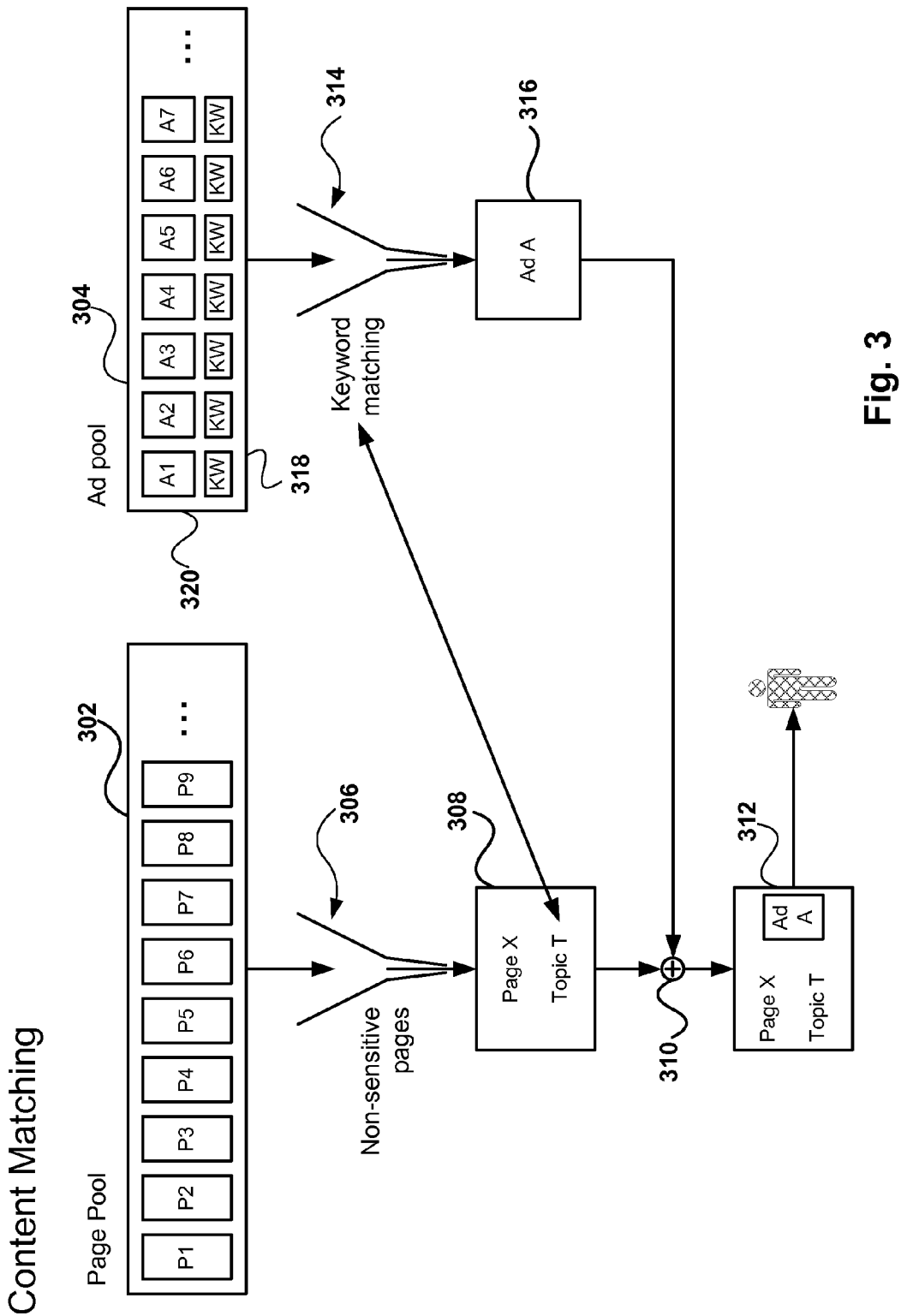
FIG. 3 depicts the process for adding advertisement into web pages, according to one embodiment of the invention.

FIG. 3 depicts the process for adding advertisement into web pages, according to one embodiment of the invention. Sponsored-searches present advertisements in the search results resulting from a user's query to a search engine. Typically, the ads are short and textual in nature and appear at the top or the side of the search results. The keywords are typically matched to the user query, and when an ad is found whose keywords match the user query, the ad is shown to the user.

In a content match system, the ads are placed in web pages 302 based on the content of the web pages. The system extracts a set of key terms from the web page to represent its content, and then matches the key terms from the web page to the keywords 318 associated with advertisement 320 from ad pool 304.

Both sponsored search and content match systems rely on sentence retrieval technology to retrieve ad candidates to be shown to the user. In sponsored search, the sentence retrieval is in response to a user query. In content match, the sentence retrieval is in response to a set of key terms that represent the topic of the web page, but the same retrieval technology can be applied to both systems.

Page pool 302 includes the web pages that are candidates for ad placement when downloading the pages to users. In operation 306, the sensitive pages are filtered out as candidates for advertisement. The topic of page 308 is keyword matched 314 to select one or more ads 316 from ad pool 304. Page 308 and ad 316 are downloaded 310 to the user and presented as combined web page 312.

In one embodiment the filtering of sensitive pages is done at a group level, and all pages are filtered under the same sensitive criteria, typically defined by the ad-serving company. In another embodiment, each advertiser configures the filtering of sensitive web pages according to their needs. Different criteria can be configured, including by sensitivity category, probability of error, estimated demographics of user, subject of page, etc. It should be appreciated that the embodiments presented for sensitivity categorization are exemplary forms of page topic categorization. The systems and methods presented here can also be used to perform other types of page filtering beyond sensitivity. The embodiments presented should therefore not be interpreted to be exclusive or limiting, but rather exemplary or illustrative. For example, a categorization system may be used to filter in or filter out web pages with commercial content.

In the following figures, details for the categorization process are provided. At a high level, the categorization process includes these operations:

1. Define a number of words or phrases that capture the nuances of a sensitive category. For example, in the adult category the words that relate to this category include, adult gallery, porn, XXX rated, etc. Approximately a few hundred such words or phrases are usually sufficient to capture all concepts associated with a certain sensitivity category. This operation requires limited manual work.
2. Use the identified words or phrases as queries in a search engine, and for each of them collect the top N (e.g., N=10-20) algorithmic search results. This operation is automatic.
3. Label this limited set of pages by editors to identify which pages are sensitive and which pages are not. These pages are used as a training-set seed. This operation requires limited manual work.
4. Expand the training set seed with other known non-sensitive pages pre-categorized in a taxonomy. This expansion augments the training set built in the previous operation. At this point, enough sensitive and non-sensitive pages have been identified to cover the sensitive category and the rest of the web population. This operation is automatic.
5. Train an initial classifier using the augmented training set from operation 4. This operation is automatic.
6. Use an active learning procedure to tune the classifier from operation 4 to the advertising traffic pages. This operation can be iterated between automatic web page selection and manual labeling of selected web pages. The manual part can be rather limited.

Figure 4:
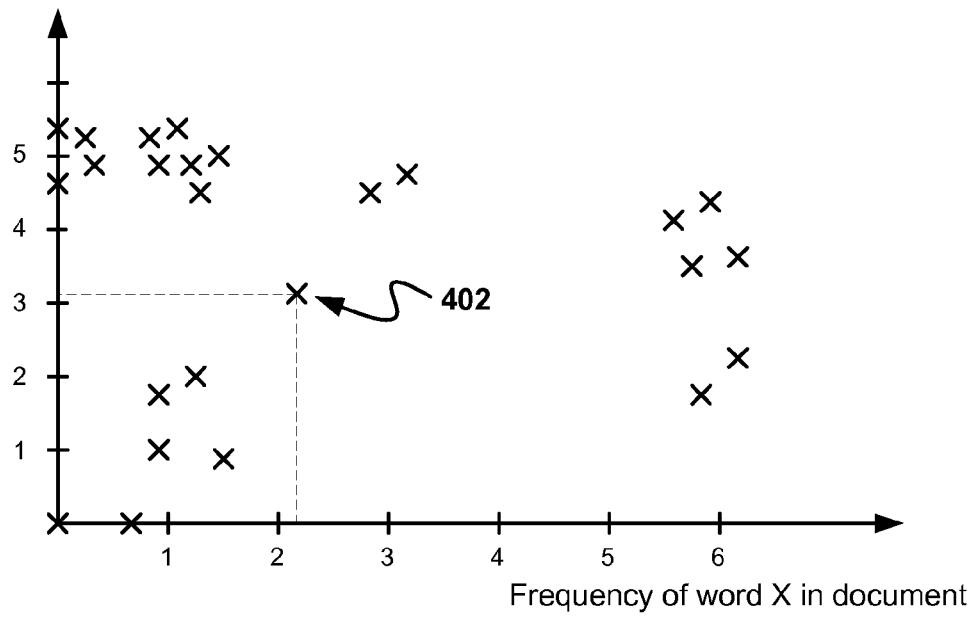
FIG. 4 illustrates an embodiment of a two-dimensional graph for categorizing web pages.

FIG. 4 illustrates an embodiment of a two-dimensional graph for categorizing web pages. The data is represented using a bag-of-words model over unigrams extracted from the page. Information about the html tags is preserved in our feature construction process. For example adult_t (the word adult appearing in the title) is treated different from the word adult_b (adult appearing in the body of the document). The final dictionary consists of all words that appear in at least ten pages among the editorially labeled and the background data. A stopword list is used to remove some high frequency non-descriptive words. The dimensionality of the resulting feature space is typically around 1 million. Every page is then represented as:

$$x_i = \left( \frac{x_{i0}}{\|x_i\|}, \frac{x_{i1}}{\|x_i\|}, \cdots, \frac{x_{in}}{\|x_i\|} \right) \quad (1)$$

Where $x_{ij}$ is the frequency with which the j-th word in the dictionary appears in the page $x_i$. $\|x_i\|$ is the norm for $x_i$ and is calculated as the square root of the sum of squares of the number of times each word appears in the web page. Experimental evidence shows that the above representation of examples as directions on the unit sphere yields significantly better performance as opposed to no normalization or feature-wise standardization.

A two-dimensional space is used to graphically describe some of the operations of the method, such as FIG. 4. The real model is expanded to a multi-dimensional space, but the principles of the method can be identified in the two-dimensional examples. Each axis is used to describe some function of the number of times a particular word appears in the web page. The web page is placed in the two-dimensional space according to the two coordinates. For example, page 402 includes word X (e.g., "car") 2.2 times and word Y (e.g., "politics") 3.1 times.

Pages about car crashes will have the word car often, while the word "politics" may not appear at all or appear at a very low frequency. On the other hand, pages about health care reform will include the word "politics" more often than the word "car." Many pages will not have either of the words.

Figure 5:
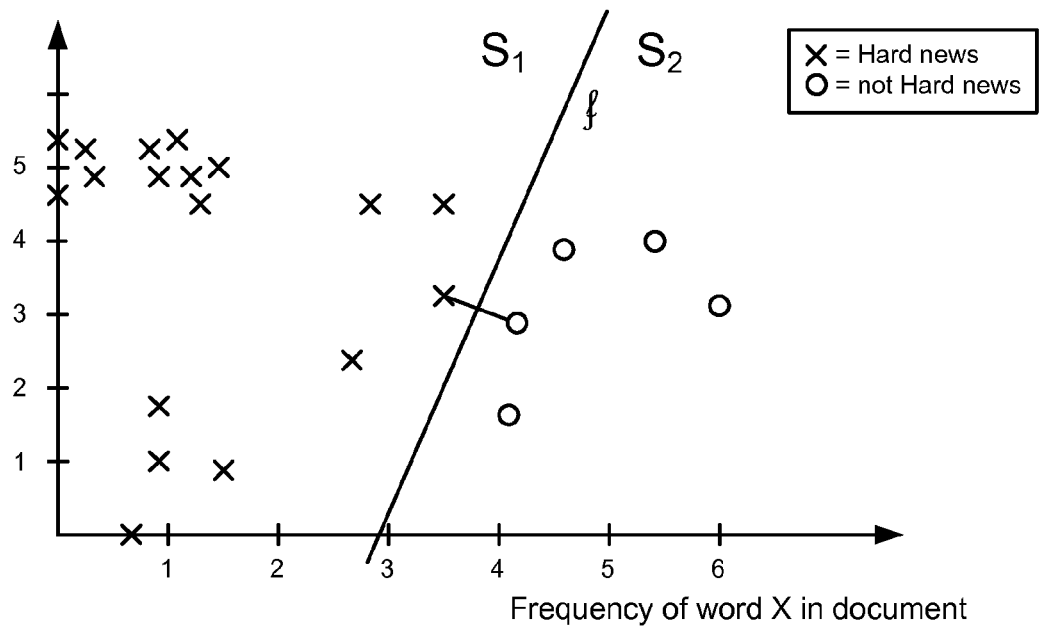
FIG. 5 depicts the computation of a categorizing function for web pages, according to one embodiment.

FIG. 5 depicts the computation of categorizing function $f$ for web pages, according to one embodiment. In each category, a large number of pages (e.g., 10,000) is identified and labeled by editors as sensitive or not sensitive. FIG. 5 shows the result for categorizing a set of web pages and identifying which pages are categorized as "Hard news" (X), and which pages are categorized as not being "Hard news" (0). The calculated classifier separates the spaces $S_1$ and $S_2$. $S_1$ includes the pages with hard news, where the boundaries of $S_1$ are defined by the categorizing function $f$. $S_2$ holds the pages without hard news and is supplementary to $S_1$. Support Vector Machines (SVM) is a method of calculating the classifier f.

Support vector machine is a supervised learning method used for classification or regression. In simple words, given a set of training examples, each example marked as belonging to one of two categories, an SVM training algorithm builds a model that predicts whether a new example falls into one category or the other. Intuitively, an SVM model is a representation of the examples as points in space, mapped so that the examples of the separate categories are divided by a clear gap that is as wide as possible. New examples are then mapped into that same space and predicted to belong to a category based on which side of the gap they fall on.

More formally, an SVM constructs a hyperplane in a high or infinite dimensional space, which can be used for classification, regression or other tasks. Intuitively, a good separation is achieved by the hyperplane that has the largest distance to the nearest training data points of any class (so-called functional margin), since in general the larger the margin the lower the generalization error of the classifier.

The linear SVM classifier is very effective and efficient for text categorization, but other types of classifiers can also be used instead, such as rbf kernel SVMs, MaxEnt, Decision Trees (C5.0), Naive Bayes, Stochastic Gradient Descent, etc. Large margin linear classifiers typically show superior performance in the task of document classification. Additionally, recent linear SVM implementations have allowed the method to scale easily to millions of documents represented over millions of features.

In one embodiment, the implementation of linear SVM LIBLINEAR was used. In finding the optimal classifier $f$, the exact optimization problem that LIBLINEAR solves has the form:

$$\min_w \frac{1}{2}\|w\| + C\left(c_1 \sum_{i=1}^{p} \xi_i^1 + c_0 \sum_{i=p+1}^{l} \xi_i^0\right) \quad (2)$$

Where $$\frac{w}{\|w\|}$$

is the normal of the separation hyperplane defining the classification function. $\xi_i^1$ and $\xi_i^0$ are $L_2$ loss incurred in misclassifying a positive or negative example respectively, $c_1 (0 \leq c_1 \leq 1)$ is the weight associated with positive examples and $c_0$ ($c_0=1-c_1$) is the weight associated with negative examples. C is the tradeoff between the complexity of the classifier and its performance on the training set. A five fold cross-validation search on the grid of values $C=\{2^{-5}, 2^{-4}, \ldots 2^8\}$ and $c_1=\{0.2, 0.3, \ldots, 0.8\}$ identifies the parameters ($C^*$, $c^*_1$) that optimize the precision at recall level 90%. This set of parameters is then used with the entire training set to build a final model. It should be noted that metrics other than precision can be used to tune the parameters. Also, the range of the parameter space that is to be explored is not fixed but depends upon the computing resources that are available.

At a high level, the process to find the categorization function can be described as finding the closest points having different labels and then finding a function that maximizes the distance between these points on each space. The confidence of the categorizer can be measured by the distance of the pages from the hyperplane (decision boundary). The farther the page is from the decision boundary, the more the confidence attributed to the categorization.

Figure 6:
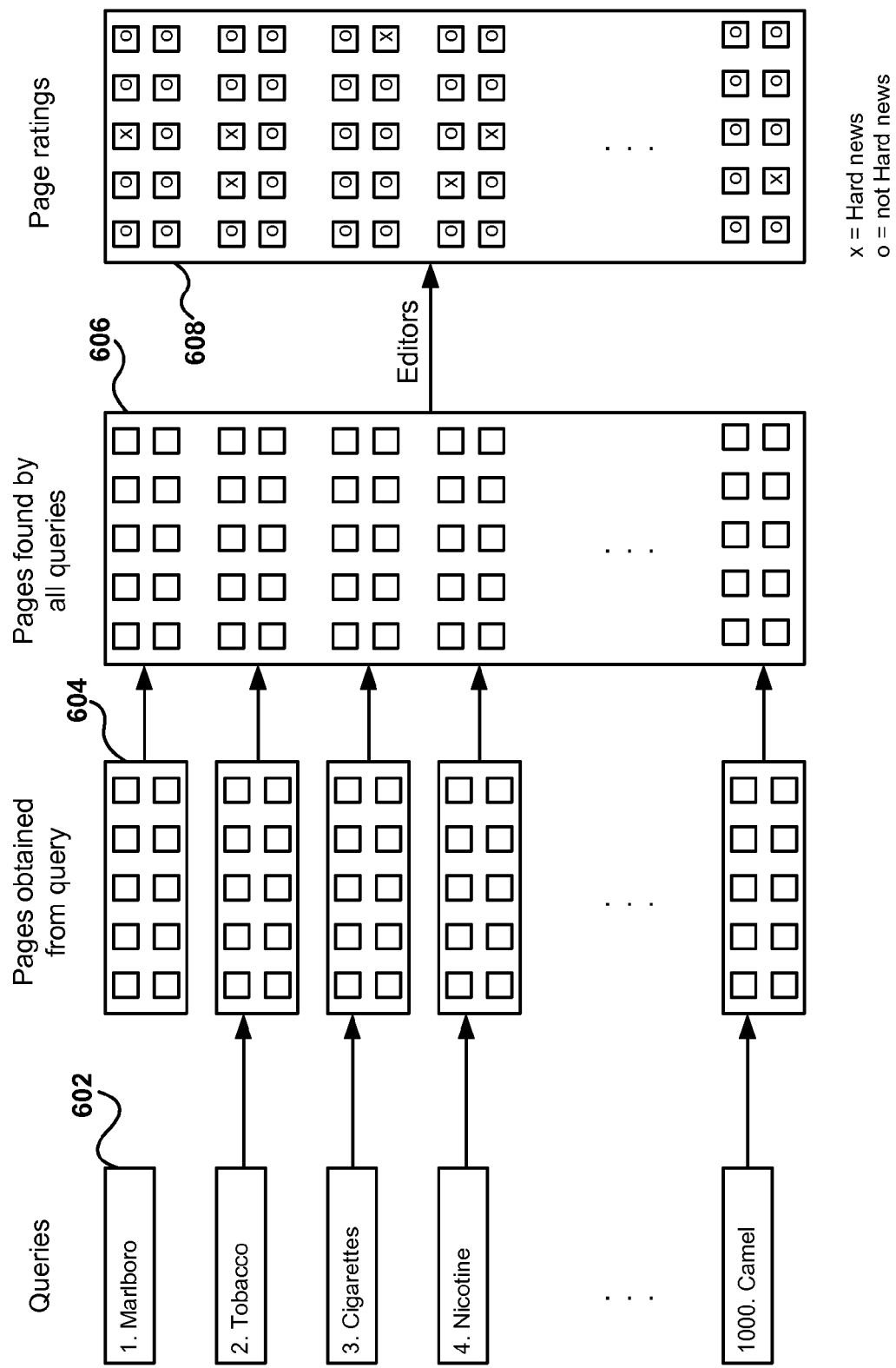
FIG. 6 illustrates the process for categorizing pages based on known sensitive words using search queries, according to one embodiment.

FIG. 6 illustrates the process for categorizing pages based on known sensitive words using search queries, according to one embodiment. Given the rarity of some of the sensitivity categories, simply drawing a uniform sample from the traffic might result in few or no sensitive pages in the training set. In order to address this issue, editors first identify "keywords" 602 that would capture all possible concepts associated with a sensitivity category. Keywords 602 are used as queries, and the top results 604 (e.g., top 10) are retrieved for each query forming the initial training set 606 for each classifier. Of course, some pages may appear as a result from two different queries, thus, the resulting training set 606 will include the union of the pages found in the searches without the redundant pages. In one embodiment, the training set includes 10,000 pages, but other values are also possible.

It should be noted that the training set collected this way is not representative of the traffic and this bias needs to be corrected at a later phase. It is also important to note that the negative examples obtained through the process are pages that were returned when querying with the selected keywords, and thus are not representative of all non-sensitive pages. In one embodiment, the negative training data is expanded with "background" pages which have been previously classified. The pages found in the queries are ranked by editors 608. The example shown in FIG. 6 includes an example for the category of tobacco, and the search queries include Marlboro®, tobacco, cigarettes, nicotine, etc.

In one embodiment, a large number of background pages were added to the negative set of editorially labeled examples, to try capture all non-sensitive concepts with respect to a particular sensitivity model. Background data was obtained from a manually maintained taxonomy into which more than 1 million pages were assigned by editors. For some of the sensitivity categories, e.g. adult, there exist corresponding nodes in the taxonomy, so these nodes were excluded from the negative set consisting of all background pages. However, for other models (e.g., hard-news death-and-suffering) there are no relevant nodes in the taxonomy. For the international markets, approximately 200,000 "reputable" pages were sampled from domains such as kr.yahoo.com or tw.yahoo.com, and used as the background data. In the absence of informative labels for background data, a classifier ($f_1$) was trained using the editorially labeled set. The background data was scored with this classifier and the top 5% of the high-scoring examples were removed, while the remaining 95% were added as negative data to the editorially labeled data. The parameter selection procedure was repeated on this new training set and a new classifier learned. It was observed empirically that the above procedure of adding background data consistently improves the generalization performance of the models.

In one month the ad-delivery system may deliver ads for a large number of web pages (e.g., 10 to 20 million). This is a large number to be classified by editors, and sampling is used to limit the number of pages selected for categorization by editors (e.g. 1,000). The process by which editors rank or categorize the pages is called supervision.

There are several problems with the accuracy of the categorization function $f$. First, many web pages are temporary. For example, if there is a death of a celebrity, the space of web pages will include a lot of news and commentary regarding the dead celebrity for a period of time. Second, sensitive pages are sparse. Only a very small percentage of the web traffic for advertisement is considered sensitive, especially for certain categories such as online pharmacies, tobacco, etc. Adult category may cover around 4 percent of web traffic, but other categories appear much less frequently. Third, some web pages may have a large number of visitors while other pages are visited only sporadically.

In one embodiment, weights are assigned to each web page according to the number of visitors to that page. This way, pages that are visited more often will have a higher influence in the calculation of the categorizing function.

Figure 7:
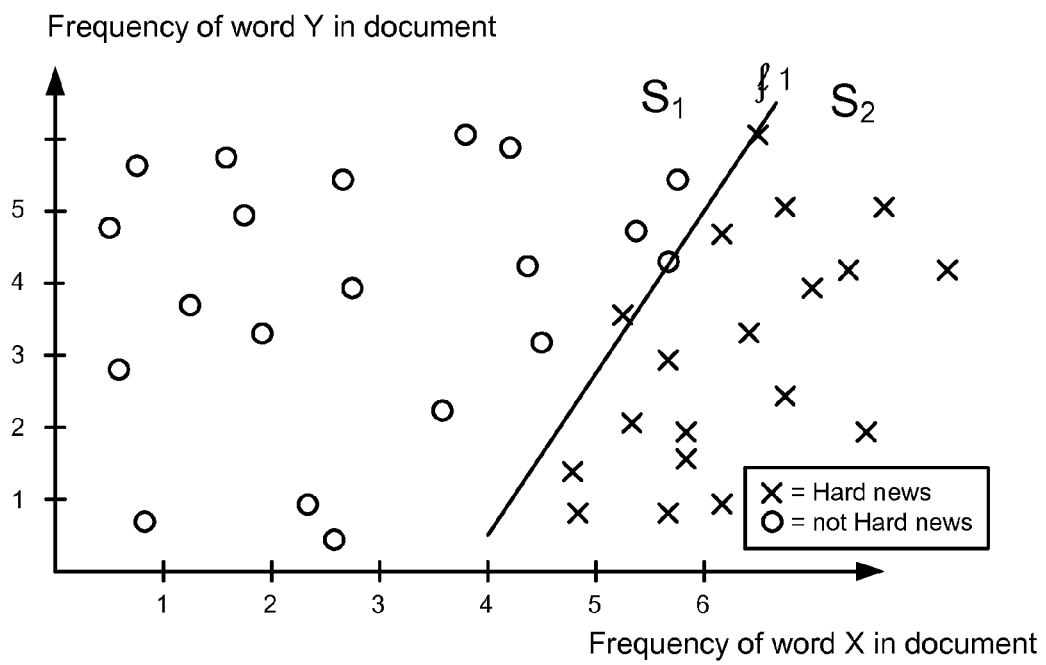
FIG. 7 illustrates the calculation of a categorizing function using the web pages obtained from search queries, in accordance with one embodiment.

FIG. 7 illustrates the calculation of a categorizing function using the web pages obtained from search queries, in accordance with one embodiment. The first categorization function $f_1$ is calculated with a small editorial set that has approximately equal number of sensitive pages (marked with an X in the graph) and non-sensitive pages (marked with an O). This editorial set is obtained from performing the search queries using sensitive words for hard news, as described above. The resulting categorization function $f_1$ is not very precise due to the bias introduced when selecting the web pages. The pages in space $S_1$ are those pages (marked with an O) not classified as hard-news pages.

Figure 8:
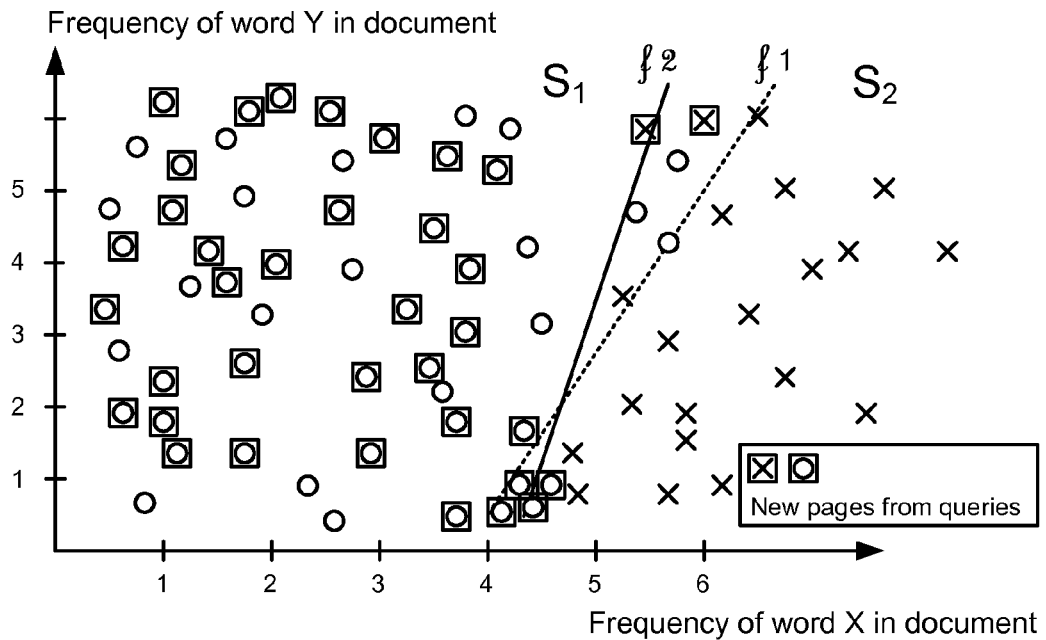
FIG. 8 illustrates the calculation of a second categorizing function after adding pages from a known taxonomy, according to one embodiment.

FIG. 8 illustrates the calculation of a second categorizing function after adding pages from a known taxonomy, according to one embodiment. The training set from FIG. 7 is expanded with other known pages pre-categorized in a known taxonomy. These pages, identified in the graph by being enclosed in a square, are randomly selected from the large space of pages in the pre-categorized taxonomy and added to the training set. A second categorization function $f_2$ is calculated with the augmented set, and the resulting categorization function $f_2$ has a higher accuracy than the previously calculated $f_1$.

A potential problem with function $f_2$ is that the pages are not representative of the whole webpage population and the results are not accurate as desired. To obtain a categorization function that takes into account web traffic, a method called Active Learning is used to enhance the categorization function.

Figure 9:
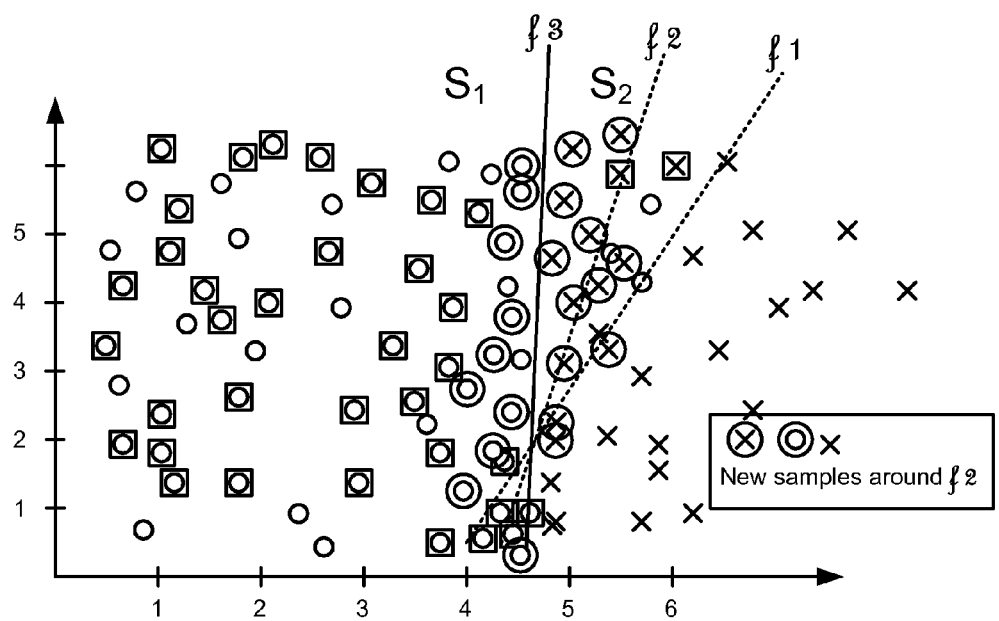
FIG. 9 illustrates the computation of a third categorizing function using active learning, according to one embodiment.

FIG. 9 illustrates the computation of a third categorization function using active learning, according to one embodiment. The main idea is to choose examples from the traffic close to the separation plane (line in our example of FIGS. 7-9). In one embodiment, an iterative process is used to arrive to the final classifier. In each iteration the current classifier is used to choose a number of "important" pages (e.g., 50-250). Then editors assign labels to the selected "active set" of pages and the classifier is retrained (recalculated) with the newly labeled examples. An embodiment of the iterative process is presented below in reference to FIG. 10.

In other words, the objective of the procedure is to select examples that would maximally shrink the space of admissible hypothesis containing the true hypothesis that would be learned if all data was labeled in advance. It has been shown that the examples which truncate the space most are those which are closest to the separation hyperplane. Using active learning, almost all of the U.S. sensitivity models were able to improve dramatically, as well as those of the international models for which it was applied.

Two essential problems were found, namely whether it should be allowed the feature space to change from one iteration to the next, and whether it was necessary to perform the expensive parameter selection procedure after each iteration. It seems that, at least empirically, arguments can be produced for and against both of these questions. For example, if the feature "Budweiser" is not in the training data and only the original feature space is used, even if "Budweiser" related pages are selected from the traffic there is a risk of missing a very important feature for the alcohol classifier. Yet if pages from the same domain were picked, features characteristic for the domain (e.g. "yahoo", "dir" etc.) might be wrongly assigned large weights as predictors for the positive or negative class. In the training process, a global dictionary was used. Also, using a fixed parameter space showed a more consistent improvement in the performance of the categorizer as active learning proceeds.

In one embodiment, the number of iterations was driven by editorial bandwidth. Thus, there were 20-40 iterations performed for each classifier. By the end of the process, for all classifiers, the performance on a testing set seemed to eventually converge. FIG. 9 shows the result of one iteration using Active Learning. The set of web pages is enlarged by adding pages near the categorizing function $f_2$. The added pages are represented in FIG. 9 as being encircled. Using linear SVM with the enlarged set, a new categorizing function $f_3$ is obtained, which divides the web pages into space $S_1$ with not sensitive pages (hard-news category) and space $S_2$ with sensitive pages.

Figure 10:
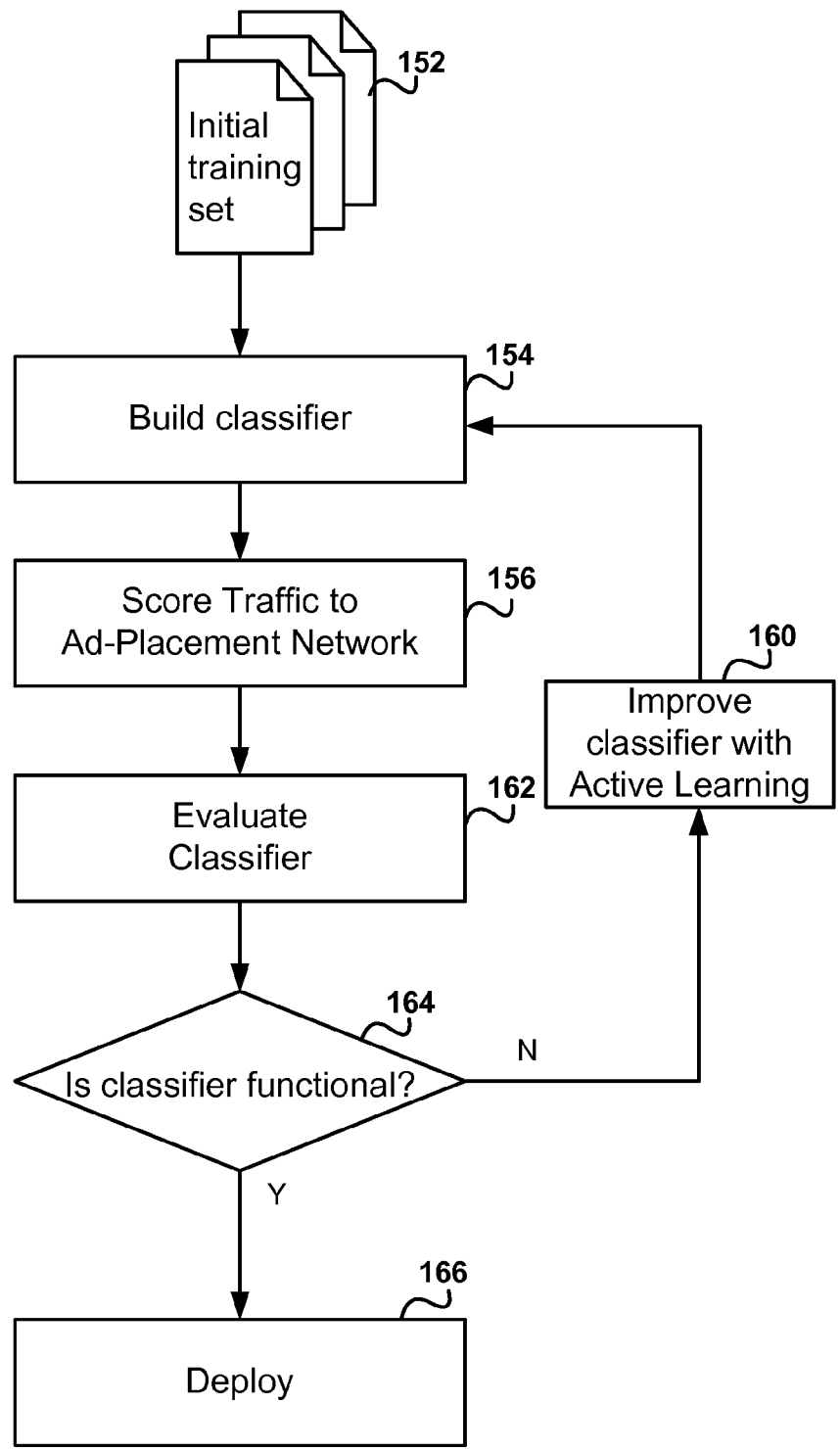
FIG. 10 shows the process flow for the sensitivity modeling life cycle in accordance with one embodiment of the invention.

FIG. 10 shows the process flow for the sensitivity modeling life cycle in accordance with one embodiment of the invention. The iterative process begins with the initial training set 152 of web pages previously achieved as discussed above in reference to FIG. 8. An initial classifier is obtained in operation 154. In operation 156, the traffic in the ad-placement network is scored.

The classifier is evaluated in operation 162 to determine its performance. More details for evaluating the performance of classifiers are given below in reference to FIGS. 11A-11B. Whether the classifier is functional for actual deployment is tested in operation 164, and if the answer is positive then the method proceeds to operation 166 for deployment. Otherwise, the method proceeds to operation 160 where active learning is used to improve the classifier. The method then goes back to operation 154 for another iteration.

Figure 11B:
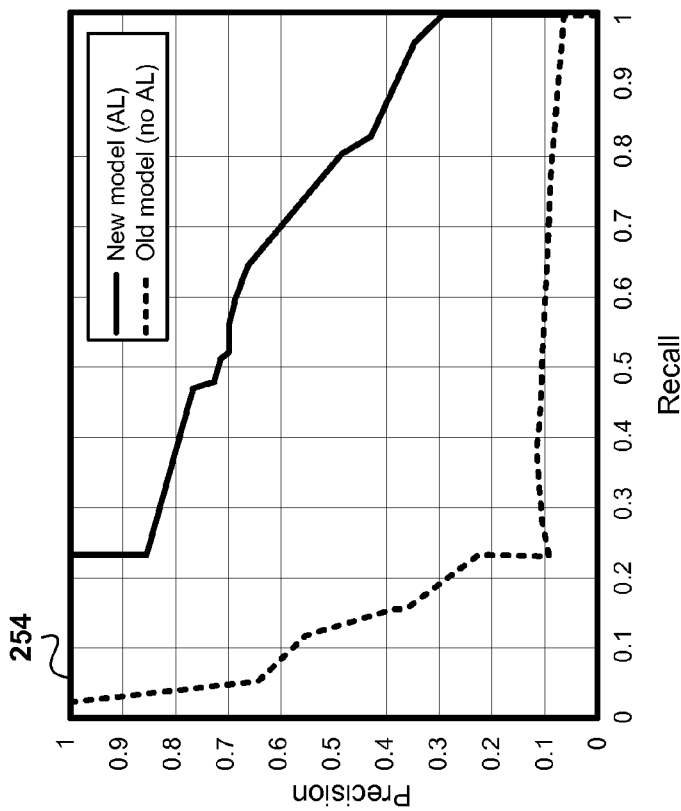
FIGS. 11A-11B show sample performance results for embodiments of the invention.
Figure 11A:
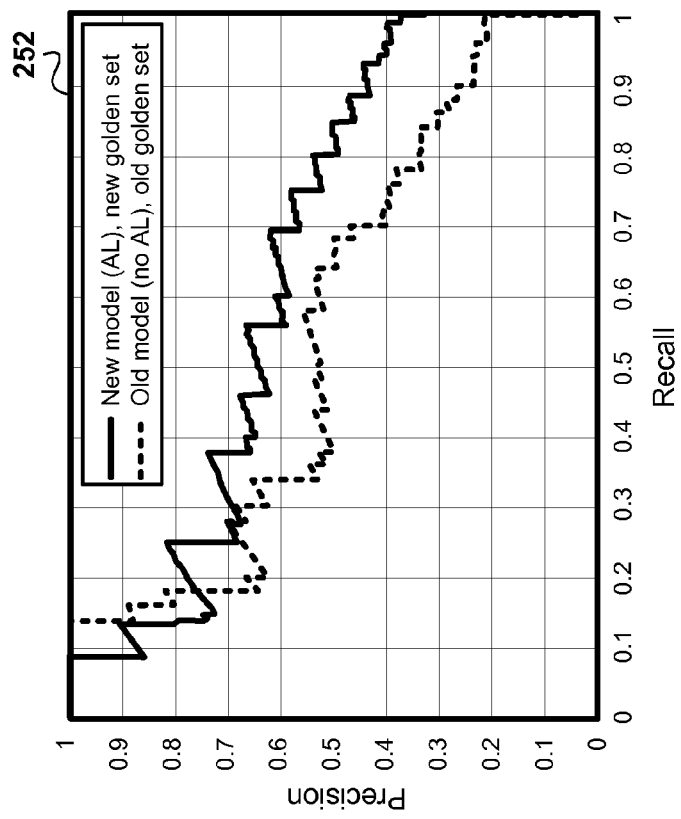

FIGS. 11A-11B show sample performance results for embodiments of the invention. Besides linear SVMs, a number of other algorithms were also evaluated on different sensitivity categories, such as RBF kernel SVMs, MaxEnt, C5.0, Naive Bayes, and Stochastic Gradient Descent. As nonlinear SVMs and C5.0 do not scale well to large dataset and feature space sizes, they were tested with only limited number of examples with aggressive feature selection. The performance was worse than that of linear SVMs but due to the limited settings for the experiments the results were an approximation. MaxEnt and Stochastic Gradient Descent, on the other hand, scale easily to larger datasets over large feature spaces but performed worse than Linear SVMs.

FIG. 11A charts the categorization functions depending on precision and recall. Precision is the fraction of the documents retrieved that are relevant to the user's information need. In binary classification, precision is analogous to positive predictive value. Precision takes all retrieved documents into account. It can also be evaluated at a given cut-off rank, considering only the topmost results returned by the system. It should be noted that the meaning and usage of "precision" in the field of Information Retrieval differs from the definition of accuracy and precision within other branches of science and technology.

Recall is the fraction of the documents that are relevant to the query that are successfully retrieved. In binary classification, recall is also called sensitivity, so recall can be considered as the probability that a relevant document is retrieved by the query. It is trivial to achieve recall of 100% by returning all documents in response to any query. Therefore, recall alone is not enough and the number of non-relevant documents must be measured also, for example by computing the precision.

To compute the expected performance of the classifier in production, the pages on which the system has served ads within a two month time frame were collected. Currently for the U.S. market, this results in tens of millions of unique pages. The pages were then scored with the calibrated model and the scores were divided into a number of buckets. In one embodiment, the score interval [0, 1] was split into the following ten buckets: $b_0=[0, 0.1], b_1=[0.1, 0.2], \ldots, b_9=[0.9, 1]$. The exact number and the boundaries of the score buckets vary across the different models. The number of pages that have a score which falls within the bounds of bucket $b_i$ is called $N_i$. Sampling is performed uniformly at random in $n_i$ examples from the bucket. This test is then repeated for all buckets to obtain the final test set. If the editors label $p_i$ of the $n_i$ labels as positive, extrapolation is used to obtain an estimate of $$\frac{N_i}{n_i} p_i$$

positive examples among the traffic with score within bucket $b_i$.

A short-coming of the above evaluation procedure is that it might underestimate the number of positive examples for a sparse sensitivity category. Due to lack of sufficient editorial resources, sampling was constrained to 1,500 pages as the test set for each classifier, which means that if millions of traffic examples fall within a certain bucket (which is often true for buckets representing scores lower than 0.1), then it is likely that there will be no sampling of any positive examples from this bucket. This is not a significant drawback as long as a classifier is accurate and well calibrated, in which case most sensitive pages will fall in high recall buckets for which a good estimate can be obtained with very small sample sizes.

FIG. 11A shows measurements of performance before and after active learning, without extrapolation to the web traffic. It can be observed that AI improves the precision for most recall levels. FIG. 11B shows a second measurement of performance using extrapolation to the web traffic. It can be observed that the new model, AI included, performs much better than the old model without AI for all levels of recall.

Figure 12:
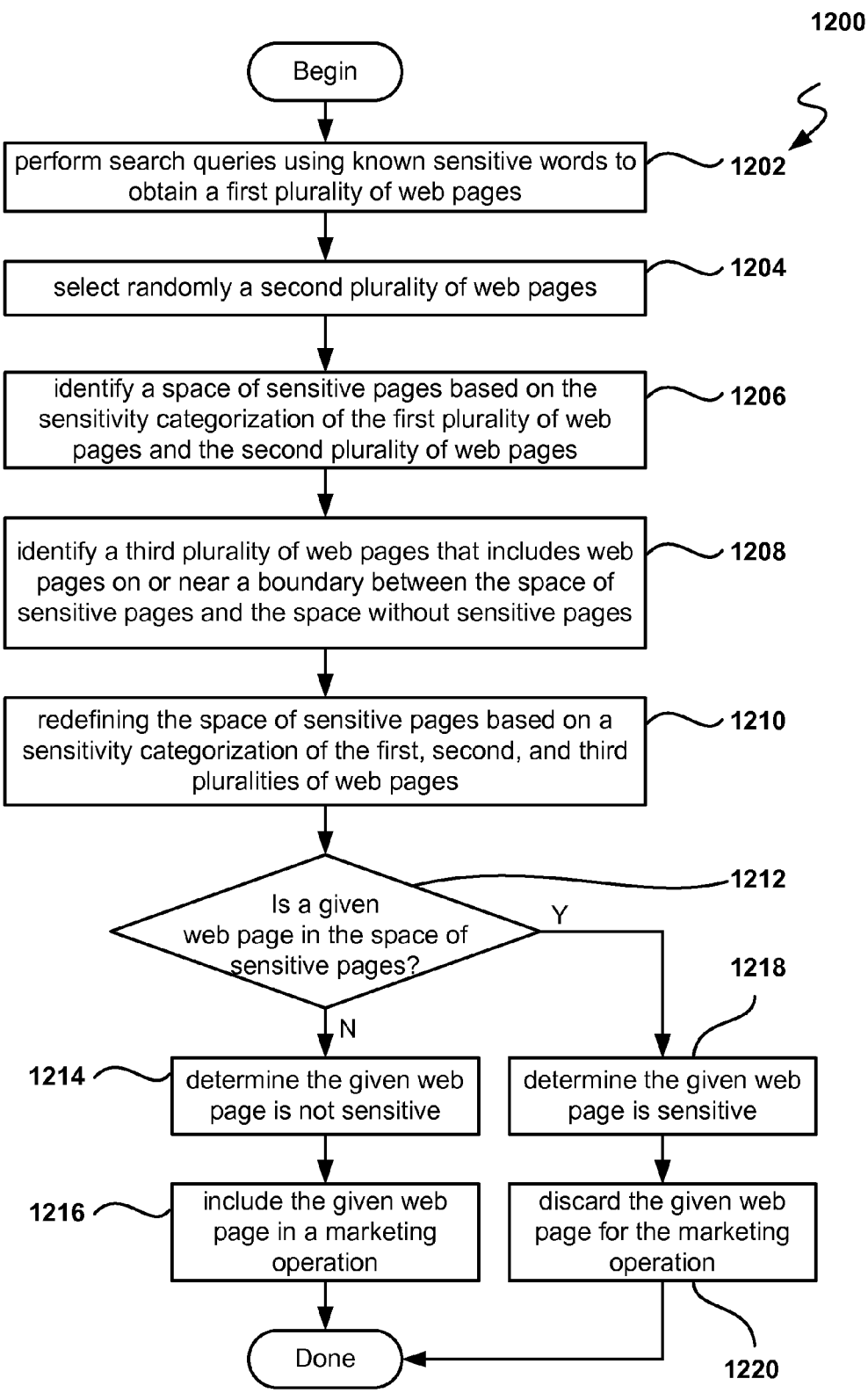
FIG. 12 shows the flow of an alternate algorithm for sensitivity categorization of web pages in accordance with one embodiment of the invention.

FIG. 12 shows the flow of an alternate algorithm 1200 for sensitivity categorization of web pages in accordance with one embodiment of the invention. Search queries are performed in operation 1202 using known sensitive words to obtain a first plurality of web pages. See for example FIG. 6 for an illustration of how to obtain and categorize web pages based on search queries. In operation 1204, the method randomly selects a second plurality of web pages from the web traffic for ad placement.

In operation 1206, the method identifies a space of sensitive pages based on the sensitivity categorization of the first plurality of web pages and the second plurality of web pages. A third plurality of web pages is identified in operation 1208. The third plurality includes web pages on or near a boundary between the space of sensitive pages and the space without sensitive pages. In operation 1210, the space of sensitive pages is redefined based on a sensitivity categorization of the first, second, and third pluralities of web pages (see $S_1$, $S_2$, and $f_3$ on FIG. 9).

Once the spaces of web pages are defined, i.e., the categorization function has been created, the candidate web pages for ad placement are tested using the sensitivity categorizations. Thus, in operation 1212 a given web page is check to see if the web page is in the space of sensitive pages. If the web page is not in the space of sensitive pages, the method flows to operation 1214, where it is determined that the given web page is not sensitive and onto operation 1216 where the given web page is included in a marketing operation. In one embodiment, the marketing operation includes adding an advertisement to the given web page when delivering the web page to a user over the Internet.

On the other hand, if the given web page is in the space of sensitive pages, the given web page is determined to be a sensitive web page. Further, in operation 1220, the given web page is discarded for the marketing operation once it is determined that the given web page is sensitive.

Figure 13:
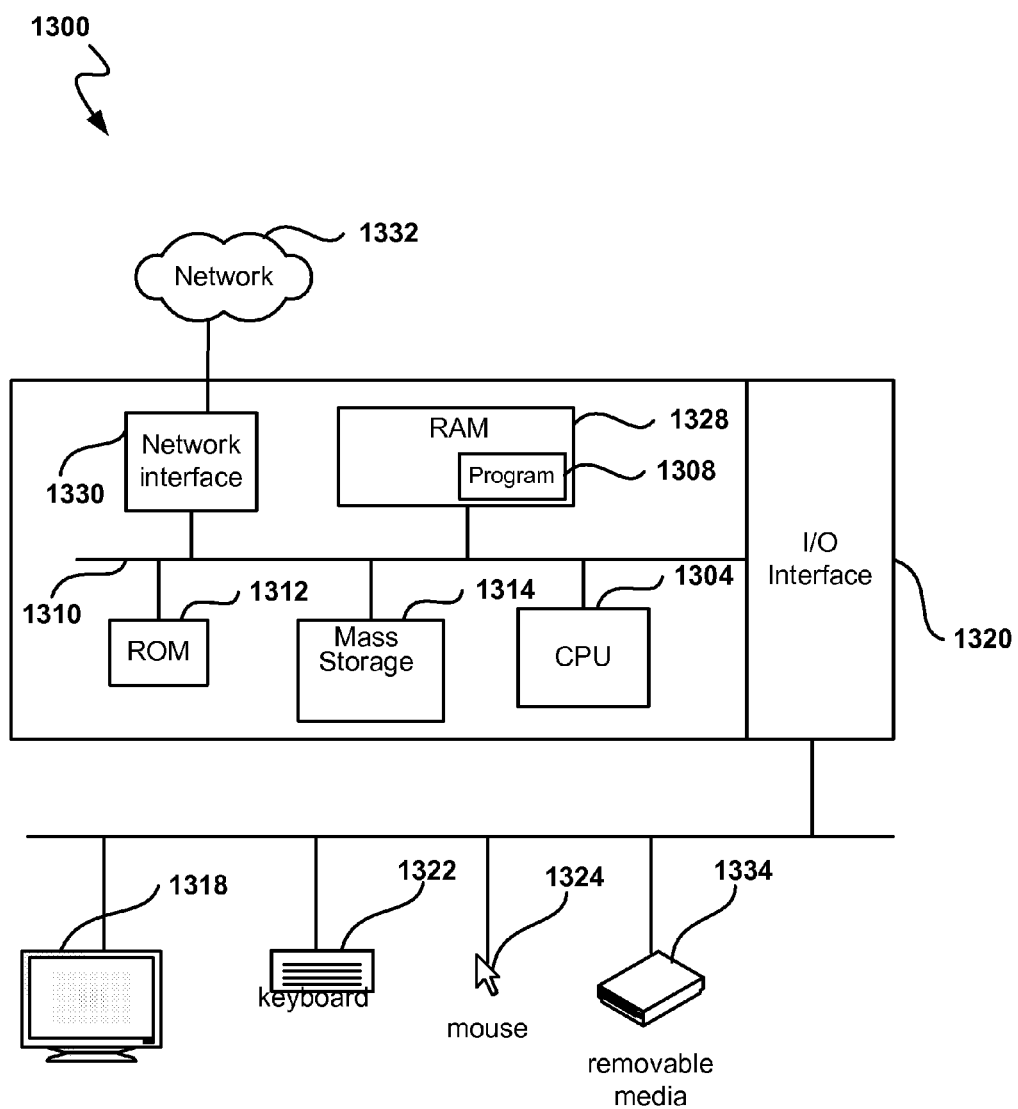
FIG. 13 is a simplified schematic diagram of a computer system for implementing embodiments of the present invention.

FIG. 13 is a simplified schematic diagram of a computer system for implementing embodiments of the present invention. It should be appreciated that embodiments of the invention described herein may be performed with a digital processing system, such as a conventional, general-purpose computer system. Special purpose computers, which are designed or programmed to perform only one function may be used in the alternative. As shown in FIG. 13, the computer system includes a central processing unit 1304, which is coupled through bus 1310 to random access memory (RAM) 1328, read-only memory (ROM) 1312, and mass storage device 1314. Program 1308 resides in RAM 1328, but can also reside in mass storage 1314. Program 1308 can include a virtual machine, a virtual router, and other programs used to implement embodiments of the invention. Mass storage device 1314 represents a persistent data storage device such as a floppy disc drive or a fixed disc drive, which may be local or remote. Network interface 1330 provides connections via network 1332, allowing communications with other devices. It should be appreciated that Central Processing Unit (CPU) 1304 may be embodied in a general-purpose processor, a special purpose processor, or a specially programmed logic device. Input/Output (I/O) interface provides communication with different peripherals and is connected with CPU 1304, RAM 1328, ROM 1312, and mass storage device 1314, through bus 1310. Sample peripherals include display 1318, keyboard 1322, cursor control 1324, removable media device 1334, etc.

Display 1318 is configured to display the user interfaces described herein. Keyboard 1322, cursor control 1324, removable media device 1334, and other peripherals are coupled to I/O interface 1320 in order to communicate information in command selections to CPU 1304. It should be appreciated that data to and from external devices may be communicated through I/O interface 1320.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for sensitivity categorization of web pages, the method comprising:
   (a) identifying a space of sensitive pages based on a sensitivity categorization of a first plurality of web pages and a second plurality of web pages, the first plurality of web pages being obtained from search queries using known sensitive words, the second plurality of web pages being randomly selected web pages;
   (b) identifying a third plurality of web pages that includes web pages on or near a boundary between the space of sensitive pages and a space without sensitive pages;
   (c) redefining the space of sensitive pages based on a sensitivity categorization of the first, second, and third pluralities of web pages;
   (d) determining that a given web page is sensitive when the given web page is in the space of sensitive pages; and
   (e) including the given web page in a marketing operation when the given web page is determined to be not sensitive and discarding the given web page for the marketing operation otherwise, wherein operations (a)-(e) are executed by a processor.

2. The method as recited in claim 1, further including:
   performing an internet search query with each known sensitive word to obtain a result set of web pages for each known sensitive word;
   selecting a predetermined number of top results within each result set; and
   combining the selected top results to obtain the first plurality of web pages.

3. The method as recited in claim 1, wherein each web page is represented as a vector, each element of the vector corresponding to a word in a dictionary, a value of each element being equal to a number of times the corresponding word appears in the web page divided by a square root of a sum of squares of a number of times each word appears in the web page.

4. The method as recited in claim 3, wherein the space of sensitive pages is a multidimensional space with coordinates defined by the vector representing the web page.

5. The method as recited in claim 1, further including redefining the space of sensitive pages using additional web pages.

6. The method as recited in claim 1, wherein sensitivity categorization is performed using a linear SVM (Support Vector Machines) function.

7. The method as recited in claim 1, wherein sensitivity categorization is performed using a function selected from a group consisting of linear SVM, RBF kernel SVM, MaxEnt, Decision Trees, Naive Bayes, or Stochastic Gradient Descent.

8. The method as recited in claim 1, wherein the marketing operation is inserting advertisement in the given web page.

9. The method as recited in claim 1, wherein redefining the space of sensitive pages further includes using active learning to improve the sensitivity categorization.

10. The method as recited in claim 1, wherein identifying the space of sensitive pages further includes:
    defining the boundary of the space of sensitive pages such that the distances between pages in the sensitive space and pages in the space without sensitive pages are maximized.

11. A computer program embedded in a non-transitory computer-readable storage medium, when executed by one or more processors, for sensitivity categorization of web pages, cause the one or more processors to perform the following operations:
    identifying a space of sensitive pages based on a sensitivity categorization of a first plurality of web pages and a second plurality of web pages, the first plurality of web pages being obtained from search queries using known sensitive words, the second plurality of web pages being randomly selected web pages;
    identifying a third plurality of web pages that includes web pages on or near a boundary between the space of sensitive pages and a space without sensitive pages;
    redefining the space of sensitive pages based on a sensitivity categorization model trained on the first, second, and third pluralities of web pages;
    determining that a given web page is sensitive when the given web page is in the space of sensitive pages; and
    including the given web page in a marketing operation when the given web page is determined to be not sensitive and discarding the given web page for the marketing operation otherwise.

12. The computer program as recited in claim 11, wherein the sensitive words belong to a sensitive category selected from a group consisting of adult, alcohol, firearms, weapons, gambling, illegal drugs, online pharmacies, tobacco, hard news controversial, hard news death, hard news suffering, or hard news scandal.

13. The computer program as recited in claim 11, further including an operation for assigning weights to the web pages according to a number of visitors to each page.

14. The computer program as recited in claim 11, wherein each web page is represented as a vector, each element of the vector corresponding to a word in a dictionary, a value of each element being equal to a number of times the corresponding word appears in the web page divided by a square root of a sum of squares of a number of times each word appears in the web page.

15. The computer program as recited in claim 11, further including an operation for redefining the space of sensitive pages using additional web pages.

16. The computer program as recited in claim 11, wherein sensitivity categorization is performed using a linear SVM (Support Vector Machines) function.

17. The computer program as recited in claim 11, wherein the marketing operation is inserting advertisement in the given web page.

18. A method for sensitivity categorization of web pages, the method comprising:
   (a) performing an internet search query for each known sensitive word to obtain a result set of web pages for each known sensitive word;
   (b) selecting a predetermined number of top results within each result set;
   (c) combining together the selected top results to obtain a first plurality of web pages;
   (d) selecting at random a second plurality of web pages;
   (e) identifying a space of sensitive pages based on a sensitivity categorization of the first plurality and the second plurality of web pages;
   (f) identifying a third plurality of web pages that includes web pages on or near a boundary between the space of sensitive pages and a space without sensitive pages;
   (g) redefining the space of sensitive pages based on a sensitivity categorization of the first, second, and third pluralities of web pages;
   (h) determining that a given web page is sensitive when the given web page is in the space of sensitive pages; and
   (i) including the given web page in a marketing operation when the given web page is determined to be not sensitive and discarding the given web page for the marketing operation otherwise, wherein operations (a)-(i) are executed by a processor.

19. The method as recited in claim 18, further including assigning weights to web pages according to a number of visitors to each page.

20. The method as recited in claim 18, wherein the marketing operation is inserting advertisement in the given web page.

\* \* \* \* \*